United States Patent
Ryan et al.

(10) Patent No.: US 6,825,622 B1
(45) Date of Patent: Nov. 30, 2004

(54) PRODUCTION LINE SPINDLE CONTROL CIRCUIT EMPLOYING A SINUSOIDAL DRIVER WITH BACK EMF CONTROL

(75) Inventors: Robert P. Ryan, Mission Viejo, CA (US); Raffi Codilian, Irvine, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 54 days.

(21) Appl. No.: 10/232,860

(22) Filed: Aug. 30, 2002

(51) Int. Cl.[7] .................................................. H02P 6/18
(52) U.S. Cl. ......................................... 318/254; 318/439
(58) Field of Search ................................. 318/138, 254, 318/439, 700, 720–722, 724

(56) References Cited

U.S. PATENT DOCUMENTS

| | | | |
|---|---|---|---|
| 5,723,957 A | 3/1998 | Ishikawa | |
| 5,798,623 A | 8/1998 | El-Sadi | |
| 5,808,440 A | 9/1998 | Bennett et al. | |
| 6,081,091 A | * 6/2000 | Mitchell et al. | 318/685 |
| 6,236,174 B1 | 5/2001 | White | |
| 6,570,360 B1 | * 5/2003 | Freeman | 318/798 |

* cited by examiner

*Primary Examiner*—Bentsu Ro
(74) *Attorney, Agent, or Firm*—Milad G. Shara, Esq.; Howard H. Sheerin, Esq.

(57) ABSTRACT

A production line spindle control circuit is disclosed for use in manufacturing a disk drive. The production line spindle control circuit generates sinusoidal driving currents applied to a spindle motor of the disk drive, and processes a back EMF signal generated by the spindle motor in order to control a commutation sequence as well as the angular velocity of the spindle motor. The production line spindle control circuit is attached to the spindle motor during a manufacturing procedure, such as servo writing, and detached from the spindle motor after the manufacturing procedure.

14 Claims, 6 Drawing Sheets

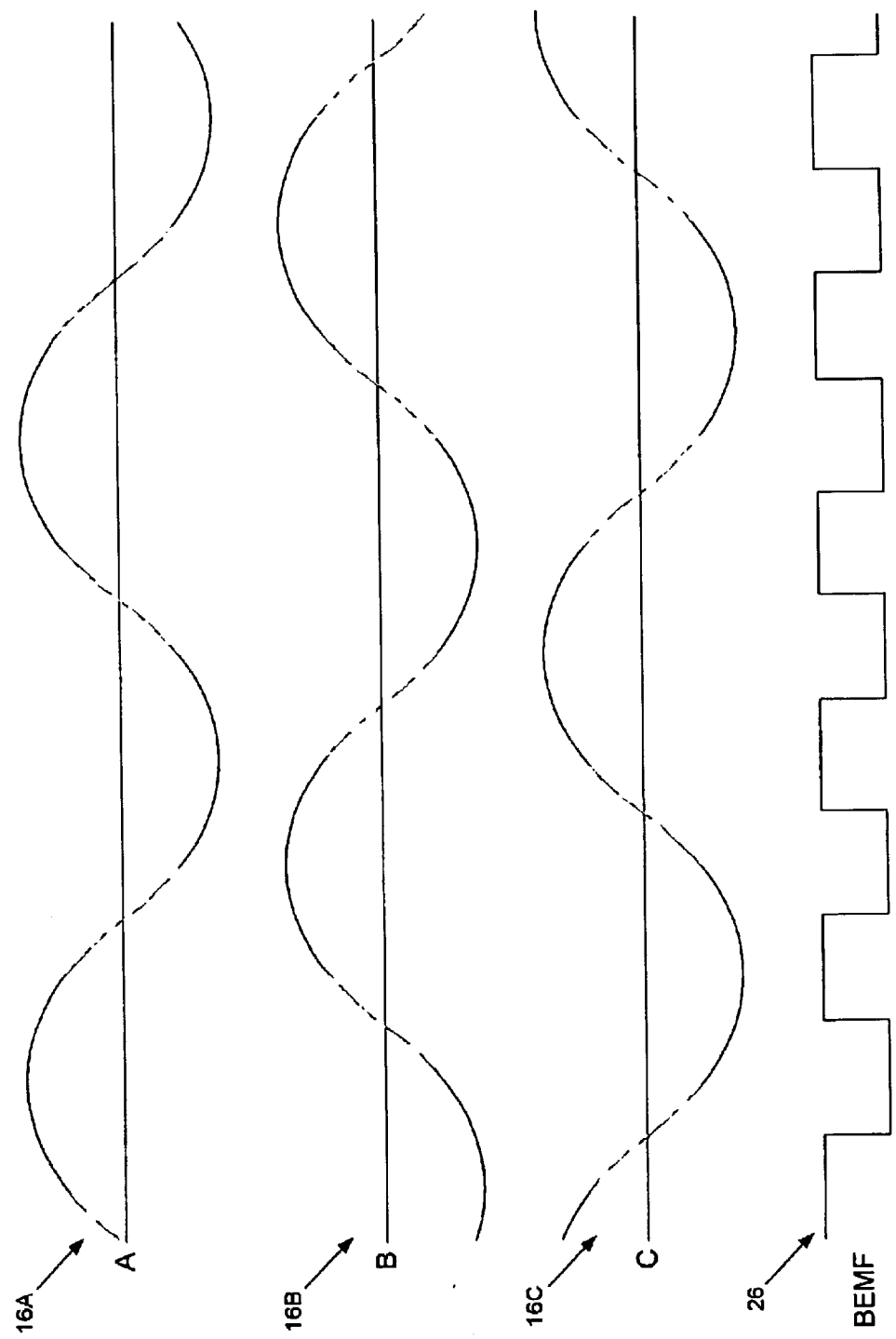

PRODUCTION LINE SPINDLE CONTROL CIRCUIT EMPLOYING A SINUSOIDAL DRIVER WITH BACK EMF CONTROL

BACKGROUND OF THE INVENTION

1. Field of the Invention

The present invention relates to disk drives for computer systems. More particularly, the present invention relates to a production line spindle control circuit employing a sinusoidal driver with back EMF control.

2. Description of the Prior Art

The spindle motor in a disk drive is typically driven by trapezoidal currents which can induce vibrations in the spindle motor. FIG. 1 shows example trapezoidal currents for driving a three phase spindle motor (comprising windings A,B,C) together with a spindle clock signal defining the commutation intervals and a back EMF zero crossing signal detected during a "window" while a selected one of the windings is not being driven. When manufacturing disk drives, a production line spindle control circuit is typically employed to control the spindle motor while performing various operations, such as diagnostics or servo writing. The vibrations caused by driving the spindle motor with trapezoidal currents can result in undesirable errors during the manufacturing process, such as written-in repeatable run-out (RRO) when servo writing the disk drive with embedded servo sectors, thereby forming eccentric tracks. The extent of written-in RRO limits the data density of the disk drive by limiting the maximum number of tracks per inch (TPI) for the servo system to function properly during normal operation of the disk drive.

U.S. Pat. No. 5,723,957 discloses a sinusoidal spindle motor driver comprising a sine wave amplitude modulating circuit which generates sinusoidal driving waveforms. The sinusoidal driving waveforms drive the windings of the spindle motor while servo track writing the disk drive during production line manufacturing. Although this technique reduces the torque ripple vibrations that cause written-in RRO, it requires integrated Hall effect elements for detecting the angular velocity of the spindle motor which increase the cost and complexity of the spindle motor.

There is, therefore, a need to drive a spindle motor in a disk drive during production line manufacturing in a manner which reduces vibrations without requiring Hall elements to detect the angular velocity of the spindle motor.

SUMMARY OF THE INVENTION

The present invention may be regarded as a production line spindle control circuit for manufacturing a disk drive, the disk drive comprising a disk, a head actuated radially over the disk, and a multi-phase spindle motor comprising a plurality of windings for rotating the disk. The production line spindle control circuit comprises a sinusoidal driver for generating a plurality of sinusoidal driving currents. The sinusoidal driving currents are applied to the spindle motor windings over an interface in order to rotate the spindle motor, and a back EMF signal is received over the interface representing a back EMF voltage across at least one of the spindle motor windings. A commutation controller within the production line spindle control circuit applies the sinusoidal driving currents to the spindle motor windings in a commutation sequence in response to the back EMF signal, and controls an angular velocity of the spindle motor in response to the back EMF signal. The interface for attaching to the spindle motor during a manufacturing procedure and for detaching from the spindle motor after the manufacturing procedure.

In one embodiment, the back EMF signal is converted into a square wave having edges defined relative to when the back EMF voltage crosses a predetermined threshold. In one embodiment, the commutation controller changes a state of the commutation sequence relative to the edges of the square wave. In one embodiment, a frequency of the square wave represents the angular velocity of the spindle motor.

In one embodiment, the sinusoidal driver comprises a linear driver for generating substantially linear sinusoidal driving currents. In another embodiment, the sinusoidal driver comprises a pulse width modulating driver for pulse width modulating the sinusoidal driving currents.

In one embodiment, the production line spindle control circuit is used by a servo writer for servo writing embedded servo patterns onto the disk during the manufacturing procedure.

The present invention may also be regarded as a method of manufacturing a disk drive, the disk drive comprising a disk, a head actuated radially over the disk, and a multi-phase spindle motor comprising a plurality of windings for rotating the disk. A production line spindle control circuit is attached to the spindle motor during a manufacturing procedure, wherein the production line spindle control circuit for generating a plurality of sinusoidal driving currents. The production line spindle control circuit receives a back EMF signal from the spindle motor, the back EMF signal representing a back EMF voltage across at least one of the spindle motor windings. The production line spindle control circuit applies the sinusoidal driving currents to the spindle motor windings in a commutation sequence in response to the back EMF signal. The production line spindle control circuit controls an angular velocity of the spindle motor in response to the back EMF signal. The production line spindle control circuit is detached from the spindle motor after the manufacturing procedure.

BRIEF DESCRIPTION OF THE DRAWINGS

FIG. 3 shows sinusoidal driving currents generated by the production line spindle control circuit in response to a back EMF signal, wherein the sinusoidal driving currents are substantially linear according to an embodiment of the present invention.

DESCRIPTION OF THE PREFERRED EMBODIMENTS

Figure 1:
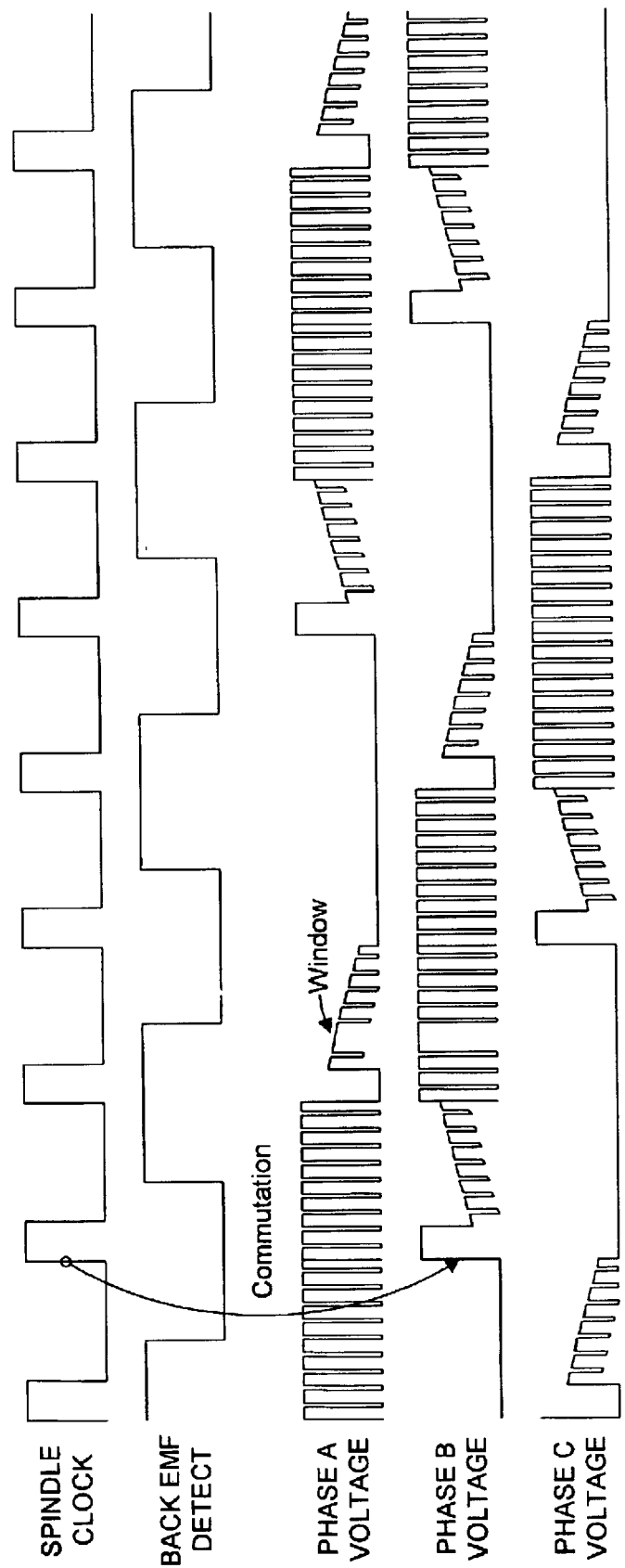
FIG. 1 shows prior art trapezoidal driving currents for driving a spindle motor in a disk drive which induces undesirable vibrations during production line manufacturing.
Figure 2A:
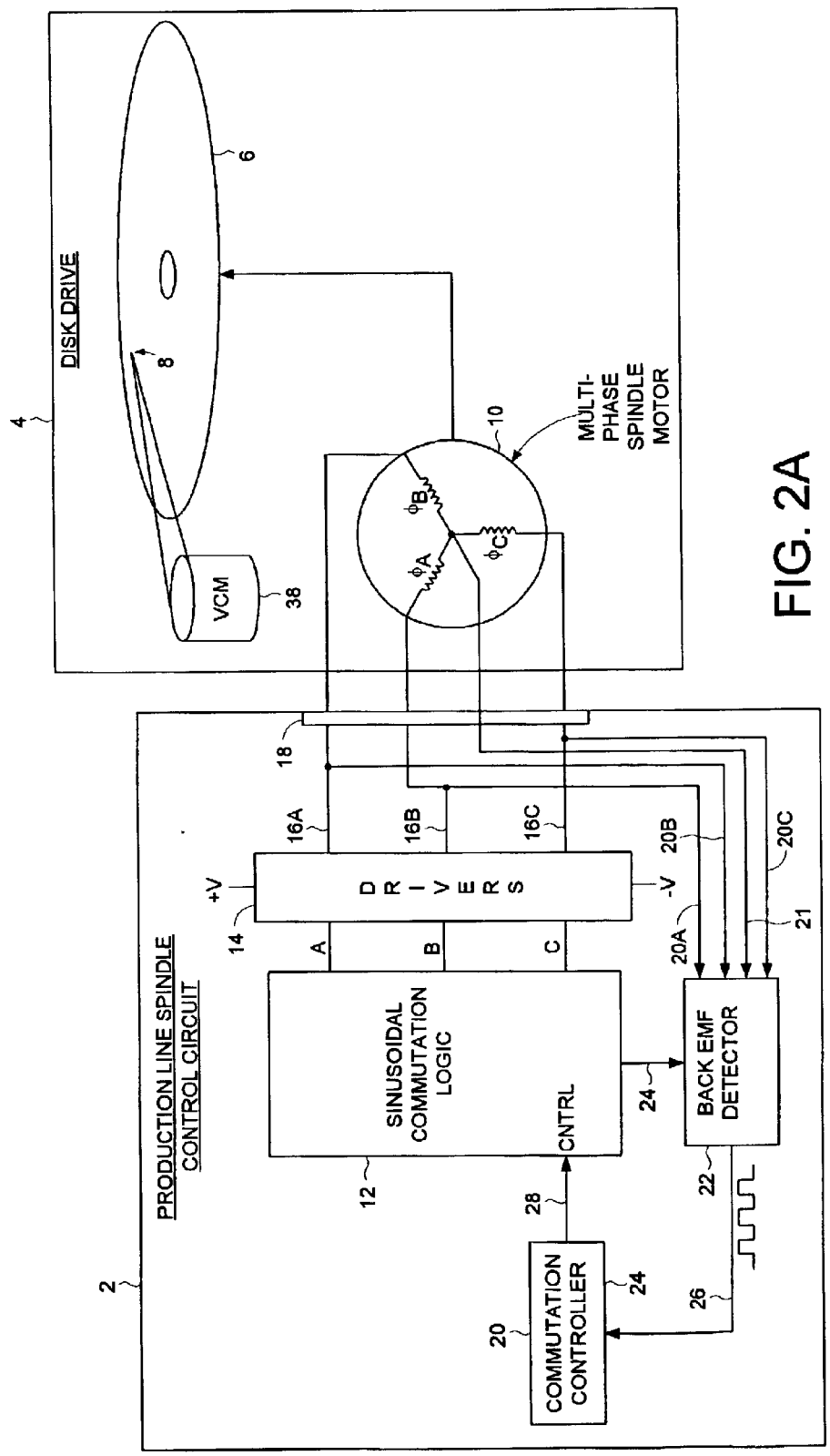
FIG. 2A shows an embodiment of the present invention comprising a production line spindle control circuit which generates sinusoidal driving currents for controlling the spindle motor of a disk drive using back EMF control.

FIG. 2A shows a production line spindle control circuit 2 for manufacturing a disk drive 4 according to an embodiment of the present invention. The disk drive 4 comprising a disk 6, a head 8 actuated radially over the disk 6, and a multi-phase spindle motor 10 comprising a plurality of windings (e.g., φA, φB, φC) for rotating the disk 6. The production line spindle control circuit 2 comprises a sinusoidal driver (sinusoidal commutation logic 12 and drivers 14) for generating a plurality of sinusoidal driving currents 16A–16C. The sinusoidal driving currents 16A–16C are applied to the spindle motor windings over an interface 18 in order to rotate the spindle motor 10. A back EMF signal 20A–20C is received over the interface 18 representing a back EMF voltage across at least one of the spindle motor windings with respect to a center tap 21. A commutation controller 20 within the production line spindle control circuit 2 applies the sinusoidal driving currents 16A–16C to the spindle motor windings in a commutation sequence in response to the back EMF signal 20A–20C, and controls an angular velocity of the spindle motor 10 in response to the back EMF signal 20A–20C. The interface for attaching to the spindle motor during a manufacturing procedure and for detaching from the spindle motor after the manufacturing procedure.

In the embodiment of FIG. 2A, the production line spindle control circuit 2 comprises a back EMF detector 22 for detecting zero crossings in the back EMF signals 20A–20C with respect to the center tap 21. Since the back EMF voltage is distorted when current is flowing, the sinusoidal commutation logic 12 supplies a control signal 24 to the back EMF detector 22 identifying the "open" winding generating a valid back EMF signal. The back EMF detector 22 generates a square wave 26 having edges defined relative to when the back EMF voltage crosses zero. The commutation controller 20 process the square wave 26 to generate a commutation clock applied over line 28 to the sinusoidal commutation logic 12. The sinusoidal commutation logic 12 changes the commutation state in response to the commutation clock. The commutation controller 20 also extracts a frequency of the square wave 26 which represents an angular velocity of the spindle motor 10. The commutation controller 20 generates a speed error relative to the desired angular velocity and actual angular velocity of the spindle motor 10. The speed error is converted into a speed control signal applied over line 28 to the sinusoidal commutation logic 12. The sinusoidal commutation logic 12 responds to the speed control signal, for example, by amplitude modulating the sinusoidal driving currents 16A–16C.

In one embodiment, the drivers 14 in the production line spindle control circuit of FIG. 2A comprise linear drivers for generating substantially linear sinusoidal driving currents 16A–16C as shown in FIG. 3. FIG. 3 also shows a back EMF (BEMF) square wave 26 having edges defined relative to the zero crossings of the back EMF voltages 20A–20C generated by the windings of spindle motor 10. The dashed lines in the sinusoidal signals represent time periods wherein the windings are disconnected from the sinusoidal driving currents 16A–16C so that the zero crossings in the back EMF signals 20A–20B can be measured accurately. The sinusoidal commutation logic 12 synchronizes the commutation sequence so that the zero crossings in the back EMF signals 20A–20B occur at the appropriate phase. The drivers 14 modulate the amplitude of the sinusoidal driving currents 16A–16C shown in FIG. 3 in response to the speed error signal generated by the commutation controller 20 derived from the frequency of the BEMF square wave 26.

Figure 2B:
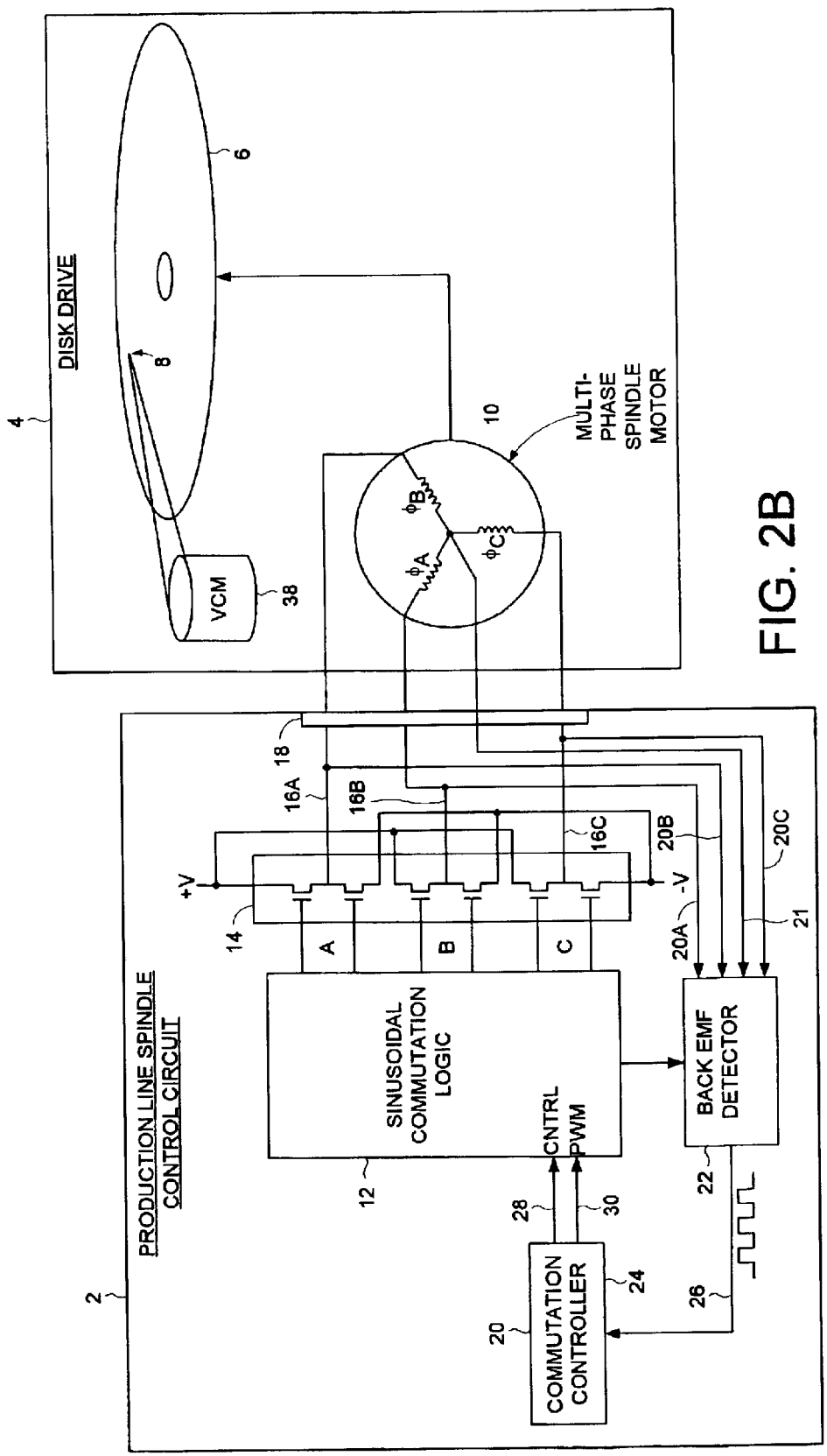
FIG. 2B shows an embodiment of the present invention wherein the production line spindle control circuit comprises a pulse width modulating driver for pulse width modulating the sinusoidal driving currents.
Figure 4:
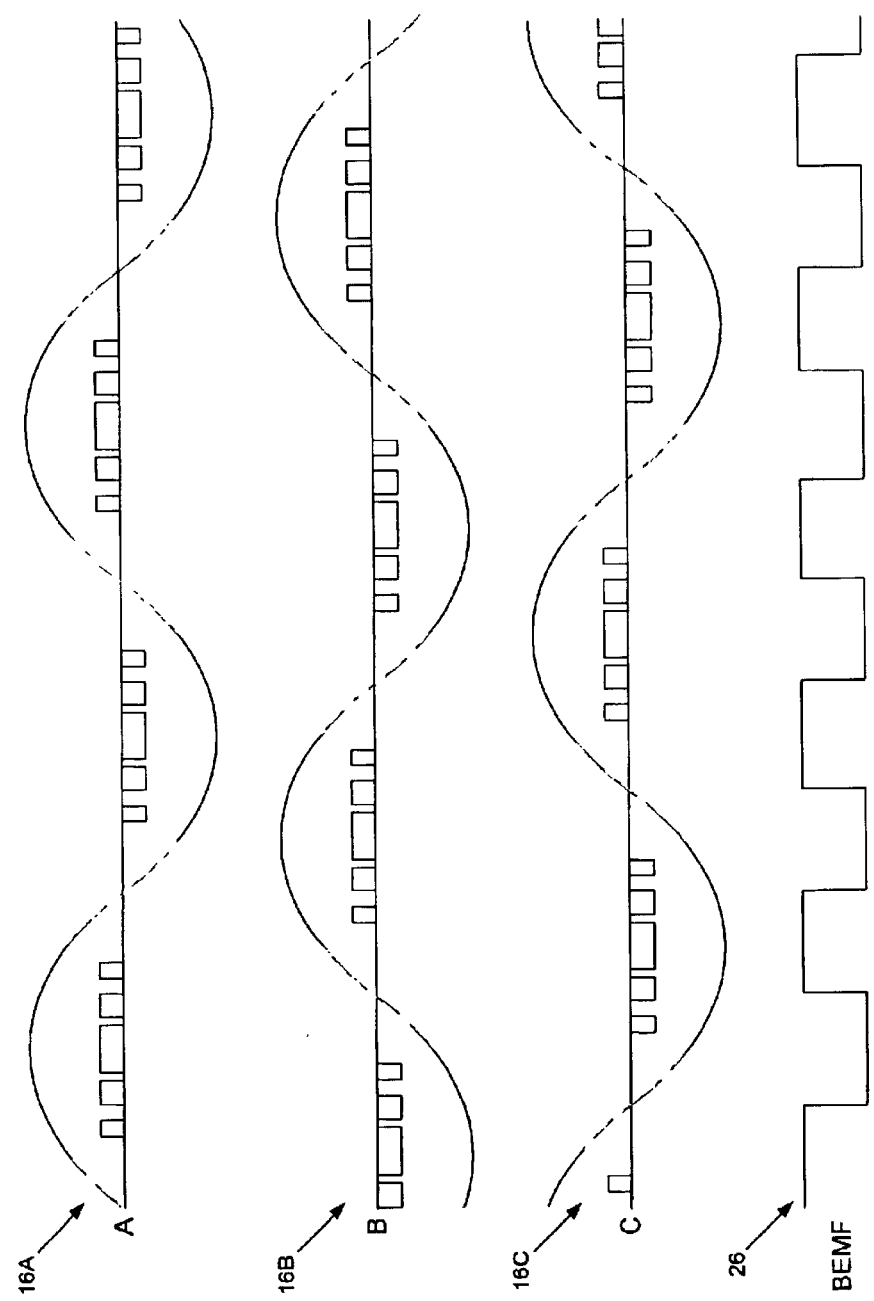
FIG. 4 shows pulse width modulated sinusoidal driving currents generated by the production line spindle control circuit in response to a back EMF signal according to an embodiment of the present invention.

In an alternative embodiment shown in FIG. 2B, the drivers 14 comprise switching elements for implementing a pulse width modulated (PWM) driver for pulse width modulating the sinusoidal driving currents 16A–16C. Each winding is connected to a pair of switching elements for connecting the winding to a positive voltage, a negative voltage, or tristate the winding (floating). An alternative embodiment may employ a single voltage supply (positive or negative) and a suitable switching algorithm. The sinusoidal commutation logic 12 controls the switching elements of the drivers 14 in a pulse width modulated sequence as shown in FIG. 4 relative to the amplitude of a corresponding sine wave. In the embodiment of FIG. 2B, the commutation controller 20 generates a PWM signal 30 for modulating the time the windings are connected to the positive or negative voltages relative to the speed error derived from the frequency of the BEMF square wave 26.

Figure 2C:
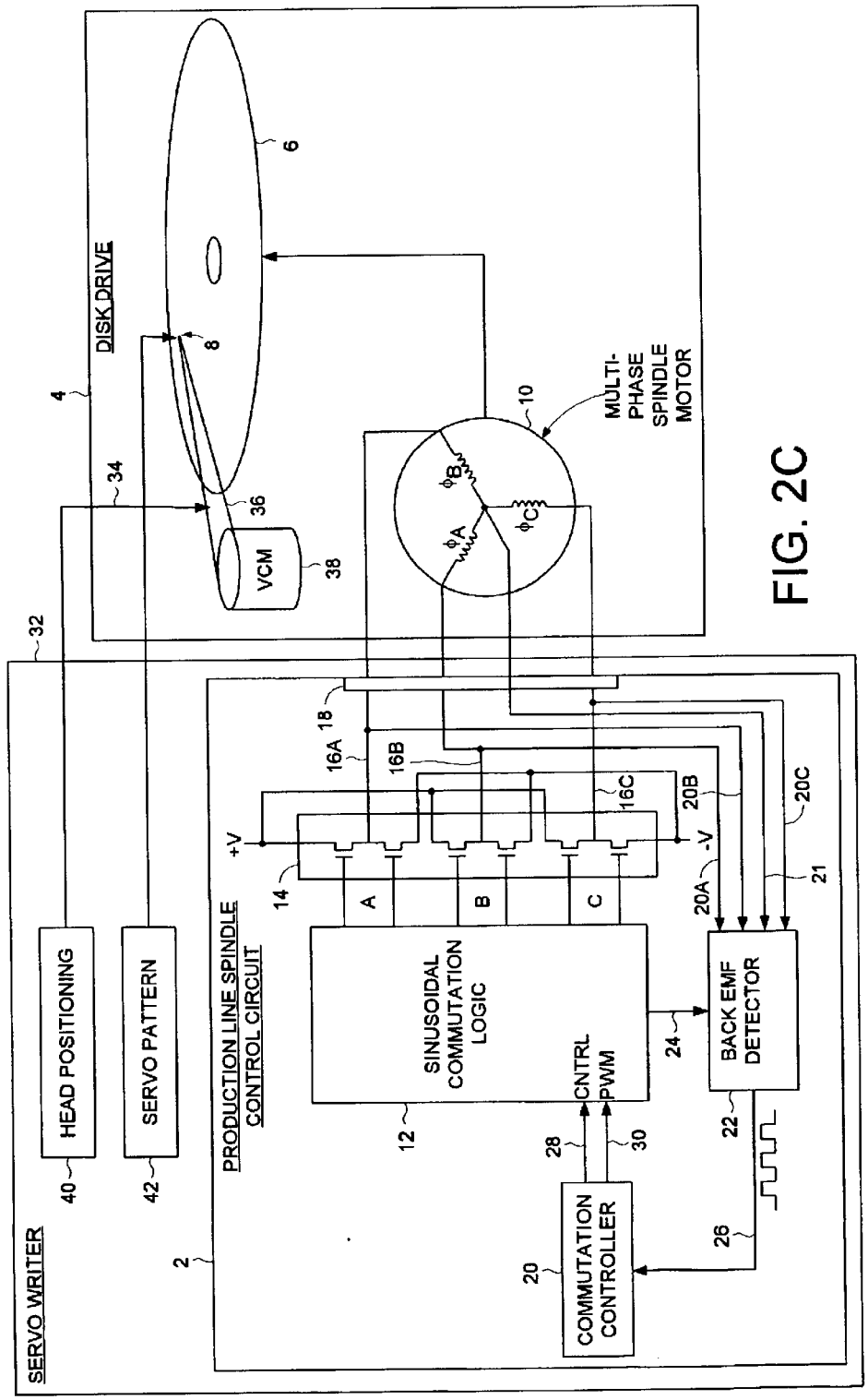
FIG. 2C shows an embodiment of the present invention wherein the production line control circuit is used by a servo writer to write embedded servo patterns onto the disk.

The production line spindle control circuit 2 may be employed during any suitable manufacturing procedure of the disk drive 4. In one embodiment, the production line control circuit 2 is used during a diagnostic manufacturing procedure. In another embodiment shown in FIG. 2C, the production line spindle control circuit 2 is used by a servo writer 32 for servo writing embedded servo patterns onto the disk 6 during the manufacturing procedure. The servo writer 32 inserts a pin 34 into the disk drive 4 which is connected to an actuator arm 36 for positioning the head 8 radially over the disk 6. The actuator arm 36 is biased against the pin 34 by applying an appropriate amount of current to a voice coil motor (VCM) 38 of the disk drive 4. The servo writer 32 comprises precise head positioning mechanics 40 including, for example, a laser interferometer for deriving an accurate radial location of the head 8 in order to position the head 8 over a target servo track. The servo writer directs the production line spindle control circuit 2 to spin the disk 6 at a desired angular velocity while a servo pattern generator 42 generates suitable servo patterns written to the disk 6 via the head 8. Because the production line spindle control circuit 2 drives the spindle motor 10 with sinusoidal driving currents 16A–16C, the written-in RRO is reduced as compared to prior art servo writers which drive the spindle motor using trapezoidal driving currents. Further, synchronizing the commutation sequence as well as controlling the speed of the spindle motor 10 in response to a detected back EMF signal reduces the cost and complexity of the spindle motor 10 as compared to using Hall effect elements as in the prior art.

We claim:

1. A production line spindle control circuit for manufacturing a disk drive, the disk drive comprising a disk, a head actuated radially over the disk, and a multi-phase spindle motor comprising a plurality of windings for rotating the disk, the production line spindle control circuit comprising:
    (a) a sinusoidal driver for generating a plurality of sinusoidal driving currents;
    (b) an interface for:
        applying the sinusoidal driving currents to the spindle motor windings in order to rotate the spindle motor; and
        receiving a back EMF signal representing a back EMF voltage across at least one of the spindle motor windings; and
    (c) a commutation controller for:
        applying the sinusoidal driving currents to the spindle motor windings in a commutation sequence in response to the back EMF signal; and
        controlling an angular velocity of the spindle motor in response to the back EMF signal,
    wherein the interface for attaching to the spindle motor during a manufacturing procedure and for detaching from the spindle motor after the manufacturing procedure.

2. The production line spindle control circuit as recited in claim 1, wherein the back EMF signal is converted into a square wave having edges defined relative to when the back EMF voltage crosses a predetermined threshold.

3. The production line spindle control circuit as recited in claim 2, wherein the commutation controller changes a state of the commutation sequence relative to the edges of the square wave.

4. The production line spindle control circuit as recited in claim 2, wherein a frequency of the square wave represents the angular velocity of the spindle motor.

5. The production line spindle control circuit as recited in claim 1, wherein the sinusoidal driver comprises a linear driver for generating substantially linear sinusoidal driving currents.

6. The production line spindle control circuit as recited in claim 1, wherein the sinusoidal driver comprises a pulse width modulating driver for pulse width modulating the sinusoidal driving currents.

7. The production line spindle control circuit as recited in claim 1, wherein the production line spindle control circuit for use by a servo writer for servo writing embedded servo patterns onto the disk during the manufacturing procedure.

8. A method of manufacturing a disk drive, the disk drive comprising a disk, a head actuated radially over the disk, and a multi-phase spindle motor comprising a plurality of windings for rotating the disk, the method of manufacturing a disk drive comprising the steps of:
   (a) attaching a production line spindle control circuit to the spindle motor during a manufacturing procedure, the production line spindle control circuit for generating a plurality of sinusoidal driving currents;
   (b) the production line spindle control circuit receiving a back EMF signal from the spindle motor, the back EMF signal representing a back EMF voltage across at least one of the spindle motor windings;
   (c) the production line spindle control circuit applying the sinusoidal driving currents to the spindle motor windings in a commutation sequence in response to the back EMF signal;
   (d) the production line spindle control circuit controlling an angular velocity of the spindle motor in response to the back EMF signal; and
   (e) detaching the production line spindle control circuit from the spindle motor after the manufacturing procedure.

9. The method of manufacturing a disk drive as recited in claim 8, further comprising the step of converting the back EMF signal into a square wave having edges defined relative to when the back EMF voltage crosses a predetermined threshold.

10. The method of manufacturing a disk drive as recited in claim 9, further comprising the step of changing the state of the commutation sequence relative to the edges of the square wave.

11. The method of manufacturing a disk drive as recited in claim 9, wherein a frequency of the square wave represents the angular velocity of the spindle motor.

12. The method of manufacturing a disk drive as recited in claim 8, wherein the sinusoidal driving currents are substantially linear.

13. The method of manufacturing a disk drive as recited in claim 8, wherein the production line spindle control circuit pulse width modulates the sinusoidal driving currents.

14. The method of manufacturing a disk drive as recited in claim 8, further comprising the step of servo writing embedded servo patterns onto the disk using the production line spindle control circuit during the manufacturing procedure.

* * * * *